US007887659B2

(12) United States Patent
Piispanen et al.

(10) Patent No.: US 7,887,659 B2
(45) Date of Patent: Feb. 15, 2011

(54) REUSE METHOD FOR UTILISING REJECT ROLLS BEING PRODUCED IN PAPER AND CARDBOARD FACTORIES

(75) Inventors: Ari Piispanen, Lappeenranta (FI); Pekka Amto, Anjalankoski (FI)

(73) Assignee: Oy Core Handling Ltd., Lappeenranta (FI)

( * ) Notice: Subject to any disclaimer, the term of this patent is extended or adjusted under 35 U.S.C. 154(b) by 735 days.

(21) Appl. No.: 11/793,079

(22) PCT Filed: Dec. 14, 2005

(86) PCT No.: PCT/FI2005/000531

§ 371 (c)(1),
(2), (4) Date: Dec. 3, 2007

(87) PCT Pub. No.: WO2006/064083

PCT Pub. Date: Jun. 22, 2006

(65) Prior Publication Data

US 2009/0095405 A1 Apr. 16, 2009

(30) Foreign Application Priority Data

Dec. 15, 2004 (FI) .................................. 20041609

(51) Int. Cl.
*B32B 37/00* (2006.01)

(52) U.S. Cl. .................. 156/184; 156/304.2; 156/304.5

(58) Field of Classification Search ................. 156/184, 156/304.1, 304.2, 304.5
See application file for complete search history.

(56) References Cited

U.S. PATENT DOCUMENTS

| | | | |
|---|---|---|---|
| 6,453,966 | B1 | 9/2002 | Ostroff |
| 6,706,133 | B1 | 3/2004 | Erkkila |

FOREIGN PATENT DOCUMENTS

| | | | | |
|---|---|---|---|---|
| FI | 104551 | B | | 2/2000 |
| JP | 2001 277382 | | | 10/2001 |
| JP | 2001277382 | | | 10/2001 |
| JP | 2002-274760 | | | 9/2002 |
| SE | 416 187 | | | 12/1980 |
| SE | 416187 | | | 12/1980 |
| WO | WO03/004393 | A1 | * | 1/2003 |
| WO | WO2005/021412 | A1 | * | 3/2005 |

* cited by examiner

*Primary Examiner*—Jeff H Aftergut
(74) *Attorney, Agent, or Firm*—Merchant & Gould P.C.

(57) ABSTRACT

A reuse method for utilising reject rolls being produced in paper and cardboard factories, wherein from the reject rolls (1) there are made straight roll cores (8) having the same size in their inner and external diameter and varying in length, the straight roll cores being defined by the width of each reject roll (2); the straight roll cores are joined end-to-end to form a long, continuous core tube (12), and the core tube is cut to size to form roll cores (14) of paper and cardboard industry.

10 Claims, 1 Drawing Sheet

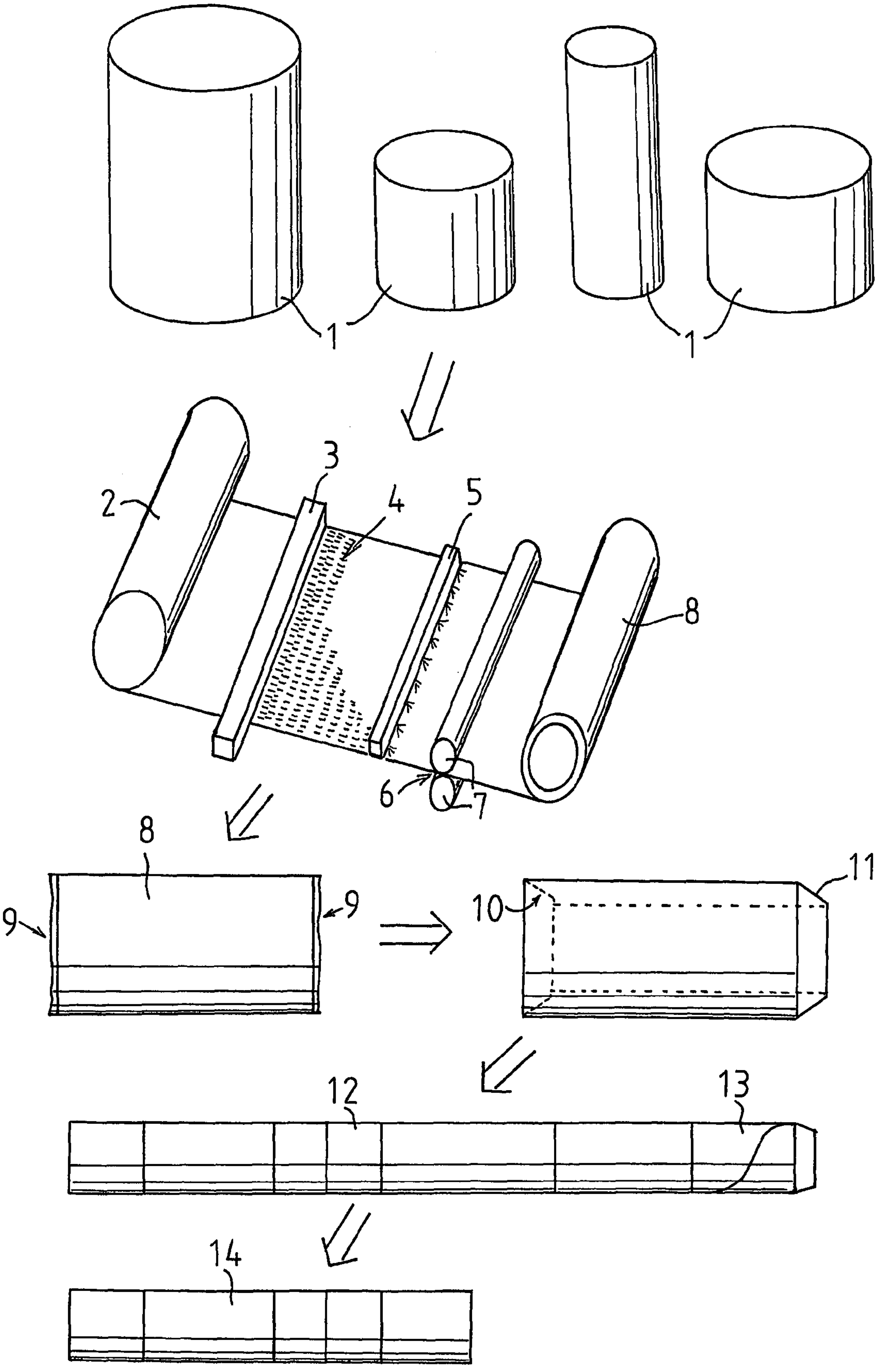
1
1
1
1
2
3
4
5
6
7
8
8
9
9
10
11
12
13
14

REUSE METHOD FOR UTILISING REJECT ROLLS BEING PRODUCED IN PAPER AND CARDBOARD FACTORIES

FIELD OF THE INVENTION

The present invention relates to a reuse method for utilizing reject rolls being produced in paper and cardboard industries.

BACKGROUND OF THE INVENTION

In cardboard and paper factories, an average of about 3-6% of the production does not find its way directly to the customer, for one reason or another. The manufacturing lots can be larger than the lots ordered, meaning that the final lot is stored in the factory to wait for another similar order. In case there will be no new order, the lot concerned remains discarded. A part of the production may contain manufacturing defects, surface defects, colour defects, etc., due to which the products are discarded. In storing and handling rolls, damage can be done to them, resulting in that the rolls cannot be delivered to the customer as prime quality products. Therefore, in the discard storage of the factory there can be even large amounts of tonnes of production, although percentually, it is a relatively small amount of the entire production of a factory.

Depending on the product to be manufactured and on the production of that moment, a part of the rejected goods can be returned to the process by pulping the reject rolls and returning the mass to the beginning of the process. This is, however, just a partial solution to handling reject rolls, because manufacturing waste is produced in different phases so that due to the variation in quality of the production, returning the manufacturing waste to a different process is not possible. Manufacturing waste often also contains multi-layer products or products coated with different materials that cannot be returned to the beginning of the process, nor to any other phase in the production.

Thus, reject rolls have become a significant problem and cost item in cardboard and paper industry. At present, they are being stored while keeping waiting for possible buyers for them, or the rolls are cut, torn and baled and delivered to some other place to separate the materials and reuse.

OBJECTIVE OF THE INVENTION

The objective of the present invention is to eliminate the disadvantages referred to above.

One specific objective of the present invention is to disclose a new type of method enabling one to utilise reject rolls in the production of the factory's own as much as possible and thus reduce the handling costs of reject rolls, as well as other production costs.

SUMMARY OF THE INVENTION

The invention starts from the observation that paper and cardboard industry necessitates a large number of roll cores that are obtained from a specialised industry. The cores are spiral cores that are manufactured by spirally winding and gluing many webs having the same width to form a core having a desired thickness and desired diameter. In practice, the material of the reject rolls would be suitable to be used in spiral cores, but the different sizes, widths and qualities of the reject rolls prevent their use in the manufacture of spiral cores. This is why the spiral cores are made of a prime quality good designed for this purpose.

Spiral cores usually get a little damaged at their ends in use so that up to now they have been disposable. As they contain a lot of glue, they have not been suited to be pulped and reused for the manufacture of regular cardboard. Furthermore because there are not many factories making core cardboard, logistics reasons are the main reason for disposing of the cores.

To overcome these problems, one has developed a method and system enabling one to join used spiral cores to one another to form a long tube, from which one can cut a reusable roll core of the desired length. This has been described in Finnish patent FI 104551. In the method, the damaged ends of used cores are cut off, enabling one to work jointing surfaces of suitable size in the undamaged ends to join the cores end-to-end to one another sufficiently fixedly and straight.

With the method, a recycling degree of more than 50% is achieved, i.e. new spiral cores are needed less than a half, and this replaceable part consists of parts cut off from the core ends, as well as of so weak cores that cannot be reused at all.

The inventive idea has started from the staring point described above. Large variation in the roll width and web length has presented a problem, making the rolls unsuited for spiral cores that require a large number of rolls of uniform width and length. Now, one has understood three things simultaneously, the combination of which has created the invention:

1. A core can be made of several pieces of cardboard or paper of different quality.

2. The length of the cores to be made is irrelevant; instead the lengths can vary freely as they are combined to form a long uniform structure.

3. Roll cores need not necessarily be manufactured to form spiral cores; instead straight roll cores are as functional and durable.

In the reuse method of the invention for utilising reject rolls being produced in paper and cardboard factories, from the reject rolls there are made straight roll cores having the same size in their inner and external diameter and varying in length, the straight roll cores being defined by the width of each reject roll. Thereafter, the straight roll cores are joined end-to-end to form a long, continuous core tube, the core tube being cut to size to form roll cores of paper and cardboard industry.

The method of the invention can use, in an arbitrary order, reject rolls varying in width and material quality, the straight roll cores made from which are joined end-to-end to one another in an optional order.

Advantageously, the ends of the straight roll cores are made uniform and straight and shaped to be suitable so that they can be glued and joined end-to-end to form a long, uniform core tube.

The straight roll core is made from the web of a reject roll by arranging glue on the surface of the open web portion and by winding or rolling the web once again to form a core having the same width and the desired wall thickness.

As the invention can use webs that are varying in their durability properties, the web is preferably so treated that glue can penetrate the web texture to implement a more adhesive gluing that stiffens the roll core.

Advantageously, the web is provided with cuts or perforations that can extend, depending on the quality of the web to be used, to a portion of the web thickness, or to the entire thickness of the web. In this manner, the glue being used penetrates, near the cuts and through them, the different material layers of the web thereby bonding and gluing the layers to one another to form a stiff whole.

At present, nearly all cardboards being manufactured include various types of multi-layer cardboards, in which the surface layers consist of a more compact structure than the middle portion of the cardboard. Thus, the glue applied to the surface of the cardboard does not penetrate deep enough, and the gluing is only performed between the surface layers of the cardboard. Therefore, preferably, cuts are used at least in multi-layer cardboards, in which between the more compact and stiffer surface layers it is possible to use relatively soft inner layers. Cuts and perforations are also well suited for compact-surface, coated, surface-glued or strongly calendered webs.

Advantageously, particularly in multi-layer cardboards, after the perforations and application of the glue, the cardboard is directed to a nip, in which it is compressed. In that case, the glue penetrates, through the perforations, the inner layers of the cardboard; the inner layers are compressed; and the surfaces layers are glued together. Thereafter, the web is rolled up into a compact core.

The structure and shape of the cuts can vary considerably, but preferably, the cuts are straight and relatively short and relatively close to one another extending uniformly through the entire area of the web being treated and glued both in the lateral and longitudinal direction thereof. As an example of the cuts we can mention 2 to 5 pieces of cuts of 2 to 5 mm/cm$^2$.

While with the aforesaid method one can obtain usable roll cores, in certain embodiments of the invention, one can spiral-seam a surface web on top of the core tube to hide the non-uniformities between the seams of the straight roll cores, to improve the durability of the seams and/or to obtain a desired appearance of the core tube prior to cutting it to form roll cores of the desired length.

However, the method of the invention does not limit in any manner the building of the core tube from used and recycled roll cores whose ends were reworked. In this manner, one can manufacture roll cores according to need and the material each time available either partly or wholly from used roll cores and from straight roll cores partly or wholly made from reject rolls.

ADVANTAGES OF THE INVENTION

The reuse method of the invention has considerable advantages compared to the prior art. The invention can use practically any web rolls being rejected in the paper and cardboard industry for one reason or another, because the web thickness, width, structure or material does not impose any limitations. Depending on the width, though, one can obtain cores of different length, which are then joined end-to-end to one another. Depending on the web thickness, they are just glued and wound a sufficient number of turns to achieve a suitable thickness and durability.

With the invention one can also gain considerable advantages when the roll cores are made from the same material as the production of that moment of the factory. In that case, the reject rolls, the core and the web can be directed to a pulper and back to the process, while conventionally, the reject rolls must be unwound and torn open prior to pulping because one cannot pulp a core of different material and return to the same process.

Thanks to the invention, one can stop the entire conventional spiral core industry. One would only use raw material ending up as reject goods and cores to be possibly recycled and re-worked. Therefore, from an environmental standpoint, the invention is very important completely eliminating the need for new pulpwood of a certain branch of industry and enabling the use of reject goods intended for secondary use as a raw material as such. Furthermore, when using straight roll cores, one can obtain straighter and more durable cores with no air pockets typical of spiral seams. In this manner, also the quality of cores is improved.

When in addition, the manufacture of roll cores is arranged in conjunction with a paper or cardboard factory, the need for both storage and transportation is reduced, and also the present transportation of new roll cores from the production plants to the factories is completely eliminated. The energy savings to be made in the whole process are considerable, and savings of several tens of percents are made in the manufacturing costs of roll cores.

In the following section, the invention will be described in detail with reference to the accompanying drawing, schematically showing one reuse method of reject goods according to the invention.

BRIEF DESCRIPTION OF THE DRAWINGS

The FIGURE depicts the process used in the reuse method for utilizing reject rolls produced in paper and cardboard factories.

DETAILED DESCRIPTION OF THE INVENTION

As shown in the FIGURE, reject rolls 1 of different quality and width are produced in a paper and cardboard factory. Using the method of the invention, these can be treated in an optional order.

We take, for example, one reject roll 2, and if it is made, for example, of a multi-layer cardboard, then in the perforation unit 3, cuts 4 are slashed or perforated densely through the entire area of the web of the roll 2, the cuts extending through the top layer of the web into the softer middle layer of the web. Thereafter, in the gluing unit 5, glue is injected or otherwise uniformly applied to the web surface. After the application of the glue, the web is directed to a nip 6, that is to say to be pressed against two rollers 7, wherein the surface layers of the web are pressed and glued together. Thereafter, the uniform and compact web is rolled up into a straight roll core 8 having the desired size as its diameter and sheathing thickness are concerned.

Next, the ends 9 of the straight roll core 8 are made uniform i.e. straightened, after which an inner bevel 10 and an outer bevel 11 corresponding to one another are lathed and milled in both ends thereof. The straight roll cores thus machined are glued and joined end-to-end to form a long and continuous core tube 12, in which one can also partly use recyclable and returned spiral cores 13.

Finally, the core tube 12 is cut to form a roll core 14 of a suitable size. It is naturally possible that core tubes are stored in longer entities and cut to the necessary size just before use.

The invention is not limited merely to the example referred to above; instead many variations are possible within the scope of the inventive idea defined by the claims.

The invention claimed is:

1. A reuse method for utilising reject rolls being produced in paper and cardboard factories, wherein from the reject rolls there are made straight roll cores having the same size in inner and external diameter and varying in length, the straight roll cores being defined by the width of each reject roll; the straight roll cores are joined end-to-end to form a long, continuous core tube; the core tube is cut to size to form roll cores of paper and cardboard industry; and wherein the straight roll core is made from the web of a reject roll by arranging glue on the open web portion and winding the web to form a core of a desired thickness.

2. The method as defined in claim 1, wherein one uses, in an arbitrary order, reject rolls varying in width and quality, the straight roll cores made from which are joined end-to-end to one another in an optional order.

3. The method as defined in claim 1, wherein the ends of the straight roll cores are made uniform and shaped prior to joining end-to-end.

4. The method as defined in claim 1, wherein the web is so treated that glue manages to penetrate the web structures to implement a more adhesive gluing that stiffens the roll core.

5. The method as defined in claim 4, wherein cuts or perforations are made in the web that extend at least through a portion of the entire web thickness.

6. The method as defined in claim 5, wherein the cuts are made in multi-layer cardboards, in compact-surface, surface-glued or strongly calendered webs.

7. The method as defined in claim 5, wherein in multi-layer card-boards, after making the cuts and applying the glue, the web is directed to a nip, in which the web is compressed to be thinner prior to winding.

8. The method as defined in claim 5, wherein cuts are made several through a small area, e.g. 2 to 5 pieces of cuts of 2 to 5 $mm/cm^2$.

9. The method as defined in claim 1 wherein on top of the core tube, a surface web is spiral-seamed to hide the non-uniformities between the seams of the straight roll cores; to improve the durability of the seams and/or to obtain a desired appearance of the core tube.

10. The method as defined in claim 1, wherein the core tube is built partly from used and recycled roll cores whose ends were re-worked.

* * * * *